United States Patent
Le Grand et al.

(10) Patent No.: US 10,356,562 B2
(45) Date of Patent: Jul. 16, 2019

(54) SYSTEMS AND METHODS FOR GRAPH-BASED LOCALIZATION AND MAPPING

(71) Applicant: GOOGLE LLC, Mountain View, CA (US)

(72) Inventors: Etienne Le Grand, Mountain View, CA (US); Mohammed Khider, Mountain View, CA (US); Luigi Bruno, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/126,905

(22) Filed: Sep. 10, 2018

(65) Prior Publication Data

US 2019/0007800 A1    Jan. 3, 2019

Related U.S. Application Data

(62) Division of application No. 15/703,779, filed on Sep. 13, 2017, now Pat. No. 10,075,818.

(60) Provisional application No. 62/394,099, filed on Sep. 13, 2016.

(51) Int. Cl.
| | |
|---|---|
| *H04W 64/00* | (2009.01) |
| *H04W 4/029* | (2018.01) |
| *H04W 24/10* | (2009.01) |
| *H04W 4/04* | (2009.01) |
| *H04W 4/30* | (2018.01) |
| *H04W 4/02* | (2018.01) |
| *H04W 4/33* | (2018.01) |

(52) U.S. Cl.
CPC ........... *H04W 4/029* (2018.02); *H04W 4/025* (2013.01); *H04W 4/04* (2013.01); *H04W 4/30* (2018.02); *H04W 4/33* (2018.02); *H04W 24/10* (2013.01)

(58) Field of Classification Search
CPC ....... H04W 24/10; H04W 4/028; H04W 4/04; H04W 4/029; H04W 64/00
USPC .......................................... 455/456.1–456.6
See application file for complete search history.

(56) References Cited

U.S. PATENT DOCUMENTS

| | | | |
|---|---|---|---|
| 8,626,443 | B2 | 1/2014 | Robertson et al. |
| 8,838,846 | B1 | 9/2014 | Tang et al. |
| 9,357,520 | B2 | 5/2016 | Le Grand et al. |
| 9,459,104 | B2 | 10/2016 | Le Grand |

(Continued)

OTHER PUBLICATIONS

"ION GNSS+ 2018" (2018). Retreieved from the Internet at: URL:https://www.ion.org/gnss/tutorials.cfm#TUT14.

(Continued)

*Primary Examiner* — Nathan S Taylor
(74) *Attorney, Agent, or Firm* — Marshall, Gerstein & Borun LLP

(57) ABSTRACT

Traces collected by multiple portable devices moving within a geographic area that includes an indoor region, each of the traces including measurements of wireless signals sources at different times by a same device, and at least some of the traces including pseudorange measurements related to distances to respective satellites. Location estimates for the portable devices and the signal sources are generated using graph-based SLAM optimization of the location estimates. More particularly, constraints for the pseudorange measurements are generated and applied for the pseudorange measurements in graph-based SLAM optimization.

20 Claims, 11 Drawing Sheets

(56) References Cited

U.S. PATENT DOCUMENTS

| | | | |
|---|---|---|---|
| 9,544,871 B2 | 1/2017 | Le Grand et al. | |
| 10,075,818 B2 | 9/2018 | Le Grand et al. | |
| 2012/0121161 A1* | 5/2012 | Eade | G09B 29/007 |
| | | | 382/153 |
| 2012/0232795 A1 | 9/2012 | Robertson et al. | |
| 2013/0244688 A1* | 9/2013 | Huang | G01S 5/02 |
| | | | 455/456.1 |
| 2013/0317944 A1* | 11/2013 | Huang | G01S 5/0252 |
| | | | 705/26.61 |
| 2013/0332064 A1* | 12/2013 | Funk | G01C 21/206 |
| | | | 701/409 |
| 2013/0332065 A1* | 12/2013 | Hakim | H04W 64/00 |
| | | | 701/411 |
| 2014/0295878 A1* | 10/2014 | Yang | G01S 5/0252 |
| | | | 455/456.1 |
| 2015/0031390 A1* | 1/2015 | Robertson | G01C 21/165 |
| | | | 455/456.1 |
| 2015/0222372 A1* | 8/2015 | Le Grand | H04W 24/04 |
| | | | 455/226.2 |
| 2015/0223189 A1* | 8/2015 | Le Grand | H04W 64/003 |
| | | | 455/456.3 |
| 2016/0033266 A1* | 2/2016 | Le Grand | G01S 19/01 |
| | | | 702/150 |
| 2016/0258782 A1* | 9/2016 | Sadjadi | A61B 34/20 |
| 2017/0048816 A1* | 2/2017 | Myeong | H04L 67/18 |
| 2018/0231385 A1* | 8/2018 | Fourie | G01C 22/00 |

OTHER PUBLICATIONS

Abdelnasser et al., "SemanticSLAM: Using Environment Landmarks for Unsupervised Indoor Localization," in IEEE Transactions on Mobile Computing, vol. 15, No. 7, pp. 1770-1782, Jul. 1, 2016.

Devoe, "Unsupervised Indoor Localization No Need to War-Drive," Networked Embedded Systems (2012).

Grebmann et al., "Towards Ubiquitous Indoor Location Based Services and Indoor Navigation," 7th Workshop on Positioning, Navigation and Communication (2010).

Kaiser et al., "Map-Aided Indoor Navigation," Indoor Wayfinding and Navigation, pp. 107-136 (2015).

Khider et al., "Global navigation satellite system pseudorange-based multisensor positioning incorporating a multipath error model," IET Radar, Sonar & Navigation, vol. 7(8): 881-894 (2013).

Li et al., "Using Barometers to Determine the Height for Indoor Positioning," International Global Navigation Satellite Systems Society IGNSS Symposium (2013).

Liu et al., "Beyond Horizontal Location Context: Measuring Elevation Using Smartphone's Barometer," UBICOMP ADJUNCT, pp. 459-468 (2014).

Puyol et al., "Pedestrian Simultaneous Localization and Mapping in Multistory Buildings Using Inertial Sensors," IEEE Transactions on Intelligent Transportation Systems, 15(4):1714-1727 (2014).

Robertson et al., "Collaborative Pedestrian Mapping of Buildings Using Inertial Sensors and FootSLAM," Proceedings of the 24th International Technical Meeting of The Satellite Division of the Institute of Navigation, pp. 1366-1377 (2011).

Robertson et al., "Simultaneous localization and mapping for pedestrians using only foot-mounted inertial sensors," Proceedings of the 11th International Conference on Ubiquitous Computing, pp. 93-96 (2009).

Shen et al., "BarFi: Barometer-Aided Wi-Fi Floor Localization Using Crowdsourcing," 2015 IEEE 12th International Conference on Mobile Ad Hoc and Sensor Systems, pp. 416-424 (2015).

Shen et al., "Walkie-Markie: indoor pathway mapping made easy," In Proceedings of the 10th USENIX conference on Networked Systems Design and Implementation, pp. 1-14 (2013).

Slideplayer.com, "No Need to War-Drive: Unsupervised Indoor Localization," (2014). Interactive presentation available at URL:http://slideplayer.com/slide/8000922/.

Wang et al., "No need to war-drive: unsupervised indoor localization," In Proceedings of the ACM 10th international conference on Mobile systems, applications, and services, pp. 197-210 (2012).

Ye et al., "B-Loc: Scalable Floor Localization using Barometer on Smartphone," 2014 IEEE 11th International Conference on Mobile Ad Hoc and Sensor Systems, pp. 127-135 (2014).

Zaliva et al., "Barometric and GPS Altitude Sensor Fusion," IEEE International Conference on Acoustic, Speech and Signal Processing (ICASSP), pp. 7575-7579 (2014).

* cited by examiner

SYSTEMS AND METHODS FOR GRAPH-BASED LOCALIZATION AND MAPPING

CROSS-REFERENCE TO RELATED APPLICATIONS

This application is a divisional of U.S. patent application Ser. No. 15/703,779, filed Sep. 13, 2017; which is a non-provisional application claiming priority to U.S. Provisional Patent Application No. 62/394,099, filed Sep. 13, 2016; the disclosures of which are incorporated herein by reference in its entirety for all purposes.

FIELD OF THE DISCLOSURE

The present disclosure relates to positioning and mapping techniques and, more particularly, to techniques for localizing signal sources and/or portable devices, with or without simultaneous mapping of geographic areas.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, techniques for positioning computing devices rely on high-altitude signal sources as Global Positioning System (GPS) satellites or pseudo-satellites, terrestrial signal sources such as 802.11 (or Wi-Fi™) access points or cellular base stations, or proximity sensing. For example, a portable computing device such as a smartphone can receive GPS signals from several satellites and determine its location on the surface of the Earth based on these signals. Similarly, a portable computing device can determine its location using a signal from an 802.11 access point or, for greater accuracy, signals from several 802.11 access points.

However, GPS satellites often are obscured by tall buildings outdoors and occluded by walls and walls indoors, causing multipath errors or failure to generate a positioning fix at all. On the other hand, locations of terrestrial signal sources are not always known.

SUMMARY

Generally speaking, a system of this disclosure obtains signals collected by multiple portable devices traversing a geographic area and applies simultaneous an optimization and mapping (SLAM) techniques to efficiently and accurately determine the positions of the portable devices as well as signal sources. The signals can include wireless local area network (WLAN) transmissions such as WiFi beacons, personal area network (PAN) transmissions such as Bluetooth® beacons, and satellite positioning signals such as GPS signals, for example. As discussed in more detail below, some of the techniques of this disclosure relate to implementing SLAM using such constraints as GPS pseudoranges, building geometry, past movement of devices through the same geographic area, etc.

One embodiment of these techniques is a method of performing SLAM optimization that includes receiving traces collected by multiple portable devices moving within a geographic area that includes an indoor region, each of the traces including measurements of wireless signals sources at different times by a same device. The method also includes determining, for each cell in the geographic area, respective probabilities of moving in various directions relative to the cell. The cells collectively define a motion map for the geographic area. The method further includes generating location estimates for the portable devices and the signal sources using graph-based SLAM optimization of the location estimates. This step includes, for at least some of the location estimates, determining to which of the cells of the motion map the location estimate corresponds and applying the measurements of wireless signals sources and the set of probabilities of the cells as a first constraint and a second constraint, respectively, in the graph-based SLAM optimization.

Another embodiment of these techniques is a computing system configured to perform SLAM optimization. The computing system includes processing hardware and a non-transitory computer-readable medium storing instructions that, when executed by the processing hardware, cause the computing system to carry out the method for performing SLAM optimization summarized above.

Yet another embodiment of these techniques is a method of localizing traces of portable devices. The method includes obtaining a motion map for a geographic area, the motion map including multiple cells, each cell including respective probabilities of moving in various directions relative to the cell. The method further includes receiving a trace of a portable device moving through the geographic area, the trace including measurements of wireless signals at different times, and generating location estimates for the portable device to localize the trace. Generating the location estimates including applying the measurements of wireless signals sources and the probabilities included in the motion map as a first constraint and a second constraint, respectively.

Still another embodiment of these techniques is a method of performing SLAM optimization that includes receiving traces collected by multiple portable devices moving with an area that includes an indoor region, each of the traces including measurements of wireless signals at different times. The method also includes generating constraints for pseudorange measurements, including obtaining device time for each satellite pseudorange measurement and using the measurement time as a separate parameter to estimate in graph-based SLAM optimization. In accordance with the method, traces are localized using graph-based SLAM optimization using both constraints generated based on pseudorange measurements and constraints based on measurements of wireless signals.

Another embodiment of these techniques is a method of performing SLAM optimization that includes receiving traces collected by multiple portable devices moving with an area that includes an indoor region, each of the traces including measurements of wireless signals at different times. The method further includes receiving floorplan data indicative of external wall geometry for the area and generating location estimates for the portable devices using graph-based SLAM optimization of the location estimate. Generating the location estimates includes, for at least some of the location estimates: determining signed distance between a location estimate and a point in the external wall geometry, and applying the signed distance as a constraint in the optimization.

Another embodiment of these techniques is a system in which the method above is implemented. In various implementations, the method and/or the system can include one or more of the features listed next. Generating the locations includes constraining the locations of the signal sources (e.g., wireless access points) to the indoor region. Generating the locations includes generating, using the external wall geometry, an attenuation factor for the signal sources disposed within the area, and applying the attenuation factor as a measurement prior in the graph-based SLAM optimization. An orientation of the indoor region is determined using the floorplan data, and the determined orientation of the indoor region is applied as a constraint on walking directions defined by the traces. Different wireless access point position models, one for an indoor region and one for an outdoor region, are generated using an output graph-based SLAM optimization. A probable entrance into the indoor region is identified as a location where at least several of the traces intersect the external wall geometry, and the probable entrance is applied as a constraint in the graph-based SLAM optimization to constrain the traces to enter and exit the indoor location via the probable entrance. The probable entrance and the external wall geometry also are applied as a constraint in the graph-based SLAM optimization to constrain portions of the traces to the indoor region. Receiving the floorplan data includes receiving indications of indoor obstacles, and generating the location estimates includes constraining portions of the traces so as to avoid the indoor obstacles. Receiving the floorplan data includes receiving three-dimensional (3D) reconstruction data from aerial and/or street-level imagery.

DETAILED DESCRIPTION

I. Localization and Mapping Concepts

Figure 1:
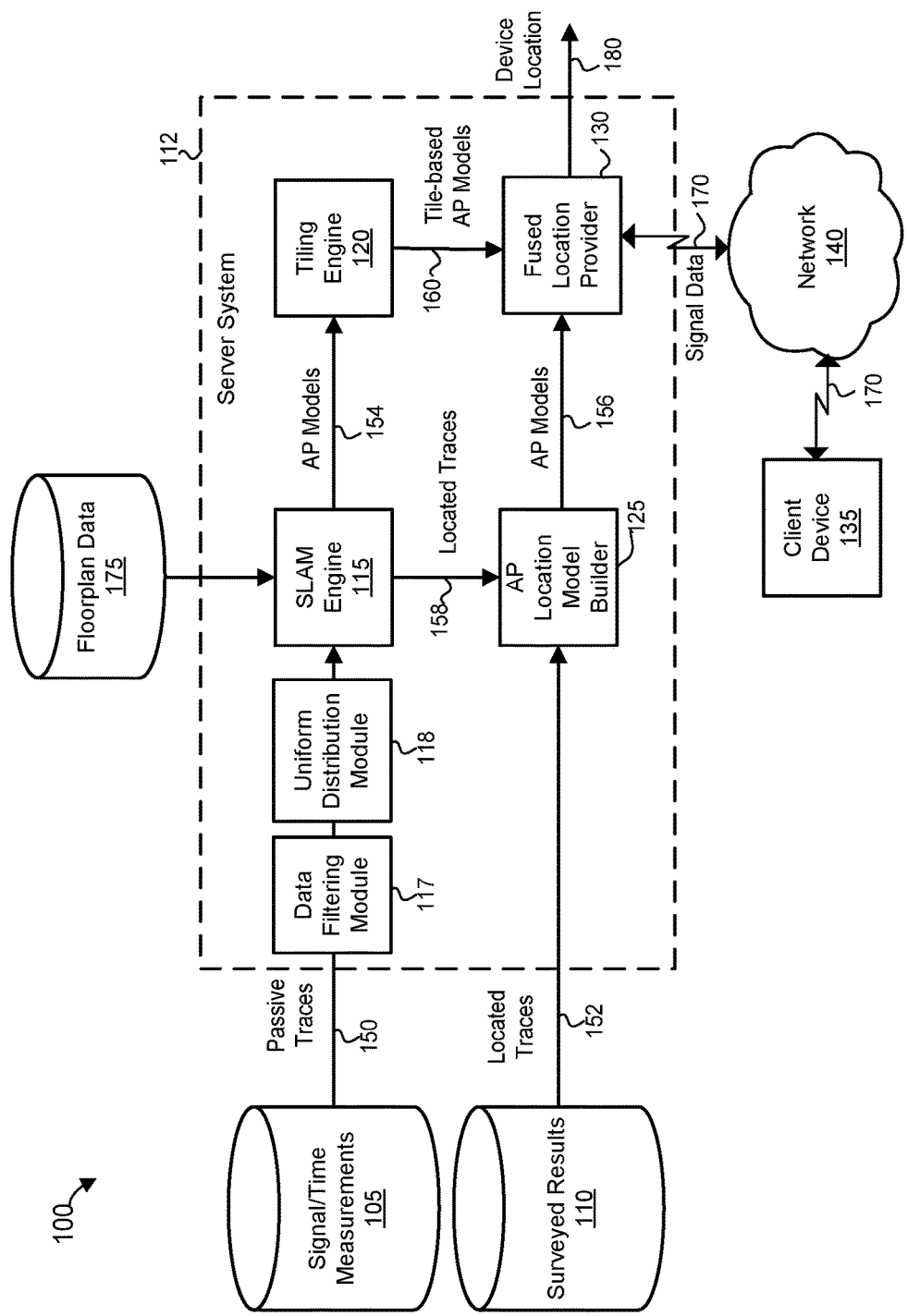
FIG. 1 is a block diagram of an example computing system in which localization and/or mapping techniques of this disclosure can be implemented.

The techniques discussed below relate to processing wireless signal readings from multiple portable devices in a geographic area to determine the locations of these portable devices at different times, the locations of sources of the wireless signals and, in some cases, the locations of other obstacles that affect the movement of the portable devices and/or signal propagation. To this end, system and methods of this disclosure can use simultaneous localization and mapping (SLAM) techniques, which allow joint estimation of locations and map features.

Before various techniques for improving SLAM input, SLAM operation, and application of SLAM output are discussed in more detail, several relevant concepts are briefly discussed below for clarity.

Generally speaking, the problem of mapping a certain area can be solved by surveying the area, e.g., observing characteristics of the area at known locations, and compiling a map from these observations. On the other hand, a localization task typically starts with a point or path to localize an existing map. Localization then can proceed by recognizing map characteristics along the way. Thus, SLAM is useful where neither mapping using known locations nor localization using an existing map is available.

A system that implements localization and mapping can receive signal traces from portable devices that traverse a certain geographic area. A trace from a portable device can include a variety of measurements, collected over time and/or at various locations, from multiple different sensors of the portable device. Each trace can be initially recorded in a log implemented in the memory of the portable device and subsequently uploaded to a network server, or the server can receive sensor readings from the portable device substantially in real time. The period of time over which a trace is collected over the last few seconds, several minutes, or even hours or days.

As used herein, sensor traces, or simply "traces," refer to sequences of observations generated by portable devices. For example, a portable device may collect over some period of time "raw" data recorded by various sensors including WLAN AP signal strength measurements, GPS signal readings, magnetic field measurements, barometer readings, accelerometer readings, gyrometer readings, proximity sensor readings, Bluetooth signal readings, etc. Some of these signals are positioning signals (e.g., GPS), while others can be used to estimate position indirectly (e.g., magnetic field measurements, WLAN AP signals), and can be referred to as "signals of opportunity." Traces can include additional data such as timestamps for every measurement. In some implementations, the user of a portable device operates certain controls and/or installs certain applications to enable the system of this disclosure to utilize the traces in SLAM optimization.

Although a trace also can include "position fixes," i.e., estimates of the geographic location at certain times, position fixes in a trace are not reliably localized relative to a map of an outdoor or indoor area and, more generally, are associated with low accuracy. GPS position fixes, for example, can include a large error in so-called urban canyons, where a satellite signal can be reflected off building walls, sometimes multiple times, before reaching a GPS receiver. Examples of non-localized observations from a portable device include the following: "at time t=2 s, the GPS module reported generate a position fix of lat=23.56789, lng=67.23456," "at time t=2.1 s, WiFi access point P1 was observed with signal strength −65 dBm and WiFi AP P2 was observed with signal strength −58 dBm," "at time t=2.2 s, a step forward was made and the orientation changed by 10 degrees clockwise."

In contrast to traces that include only relative sensor data, "localized" traces correspond to sequences of observations that are reliably positioned relative to each other and the rest of the world. For example, surveying can involve recording positions of devices relative to known locations, such as known GPS coordinates or geolocated landmarks. In some cases, people manually record surveyed locations into portable devices while the portable devices collect observations of wireless signals. Using SLAM techniques, for example, a trace can be localized to generate a "localized" trace.

As used in this disclosure, the term "landmark" can refer to a signal source, such as a WLAN access point (AP), an obstacle such as a wall with certain geometry that restricts movement of a user or vehicle and/or attenuates wireless signals, an opening in a larger obstacle via which users or vehicles can pass, etc. Landmarks can serve as parameters in a SLAM model as discussed below when generating a probabilistic geographic landscape and localizing traces.

II. Example Computing System

FIG. 1 illustrates an example computing system 100 in which SLAM techniques of this disclosure can be implemented. The system 100 includes a signal/time measurement database 105 and a surveyed results database 110, which can be implemented as parts of a same database or separate databases, depending on the implementation. The databases 105 and 110 can store information collected from various types of portable devices from various geographic areas, and at various times using crowdsourcing. In particular, the signal/time measurement database 105 can store traces and the surveyed results database 110 can store located traces.

The computing system 100 includes a server 112, made up of one or multiple server devices, each equipped with non-transitory computer-readable medium and one or more processors. The components of the computing system 100 can be disposed at different physical locations and interconnected via a communication network, if desired. In an example implementation, the server system 112 includes a SLAM engine 115, a data filtering module 117, a uniform distribution module 118, a tiling engine 120, an AP location model builder 125, and a fused location provider component 130. The components 115, 116, 117, 120, 125, and 130 are parts of the processing hardware of the server system 112 and can be implemented using software executable one or more processors, dedicated hardware, or any suitable combination of software and hardware. The example server system 112 is communicatively coupled to the databases 105 and 110. Further, a client device 135 can access the server system 112 via a communication network 140. The client device 135 can be similar to the portable devices that contribute traces to the databases 105 and 110.

In operation, the data filtering module 117 can receive traces 150 from the database 105 and filters out data points associated with low accuracy. The uniform distribution module 118 can ensure that the data points are loaded into the SLAM engine 115 in a uniform manner to avoid biases. It is noted that the order in which the components 117 and 118 process traces 150 can vary according to implementation. Further, the components 117 and 118 can be omitted entirely in some embodiments of the server system 112, in which case the SLAM engine 115 receives the traces 150 directly from the database 105.

The SLAM engine 115 receives traces 150 and generates models describing the locations of signal sources, such as AP models 154, as well as located traces 158. The SLAM engine 115 in one embodiment implements graph-based SLAM techniques, discussed below with reference to FIGS. 2 and 3. In some implementations of the system, the SLAM engine 115 also received floorplan data from a floorplan database 175, which can store external floor outlines collected from 3D reconstruction and/or aerial imagery and, for some places, exterior and interior detailed floorplans.

The tiling engine 120 can use the AP models 154 to generate AP models for specific geographic areas which can be organized into tiles, or square regions of a size fixed for the given zoom level. The tiling engine 120 can supply tile-based AP models 160 to the fused location provider 130.

Similarly, the AP location model builder 125 can generate AP models 156 using both the located traces 152 and the located traces 158. The AP location model builder 125 also can supply the AP models 156 to the fused location provider 130.

The fused location provider component 130 can use the models 156 and/or 160 to service subsequent requests from client devices such as the client device 135. In particular, the client device 135 can provide an observation such as signal strength measurements 170 from several APs. The fused location provider component 130 can use the models 156, 160 to generate an estimate of the device location 180.

The client device 135 may be a smartphone, a smart watch or another wearable device, a laptop computer, or a tablet computer, for example. While only one client device 135 is illustrated in FIG. 1 for simplicity, the server system 112 in general can service any number of client devices of various types.

III. Graph-Based SLAM Techniques

Generally speaking, SLAM input includes a set of non-localized observations Z. As discussed above, non-localized observations can include GPS signal reads, AP scans, etc. at various times. SLAM produces a probable map M along with a probable state X, which includes a position (or location) for each observation and, in some cases, sensor biases for the portable device. SLAM can be regarded as likelihood optimization over the state X and the map M. More particularly, given a state of observations Z, SLAM optimizes P (X, M|Z).

While there is no direct way to evaluate P (X, M|Z), Bayes' theorem provides the following approach:

$$P(X, M \mid Z) = \frac{P(Z \mid X, M) P(X, M)}{P(Z)} \quad \text{(Eq. 1)}$$

Here, P(X, M|Z) defines posterior probability in Bayesian statistics, which SLAM optimizes. P(Z|X, M) is measurement probability, P(X, M) is state prior, and can be treated as a fictitious measurement, and P(Z) is a measurement prior.

If conditional independence of the observations Z can be assumed, then $$P(Z|X,M) = \Pi_i^M P(Z_i|X,M), Z_i), \qquad (Eq. 2)$$

where $Z_i$ are the M observations in the set Z.

SLAM maximizes this product of measurement likelihoods $P(Z_i|X, M)$. Because $Z_i$ is given, this product is a function of only X and M. The measurement likelihoods can be derived from sensor models that describe motion and/or position measurements. For example, a measurement likelihood can be the probability associated with the statement "GPS signal fix specifies the coordinates x, y, z given that the portable device is ten meters away from the location with these coordinates," or "a pedestrian step is detected given that the position of the portable device moved by two feet since the last observation." Measurement likelihoods on which SLAM operates often are Gaussian.

Although X and M can be made up of a large number of components, typically the measurement likelihood $P(Z_i|X, M)$ depends on only a small subset of these components. For example, for a GPS signal measurement, $$P(Z_i|X,M) = P((Z_i|X_i) \qquad (Eq. 3)$$

where $X_i$ defines the actual position of the portable device at the time of measurement i. As another example, for a step measurement, $$P(Z_i|X,M) = P((Z_i|X_i, X_j), \qquad (Eq. 4)$$

where $X_i$ defines the position of the portable device at the time of measurement i, and $X_j$ defines the position of the portable device at the previous step.

One approach to optimizing the product of Eq. 2 is graph-based SLAM likelihood optimization, and can be understood in terms of an analogy to mechanical springs, i.e., mechanical devices that store energy in proportion to the square of the displacement relative to the equilibrium position ($x^2$). For additional clarity, an example graph-based SLAM approach which the SLAM engine 115 can implement is discussed next with reference to FIGS. 2 and 3.

Figure 2:
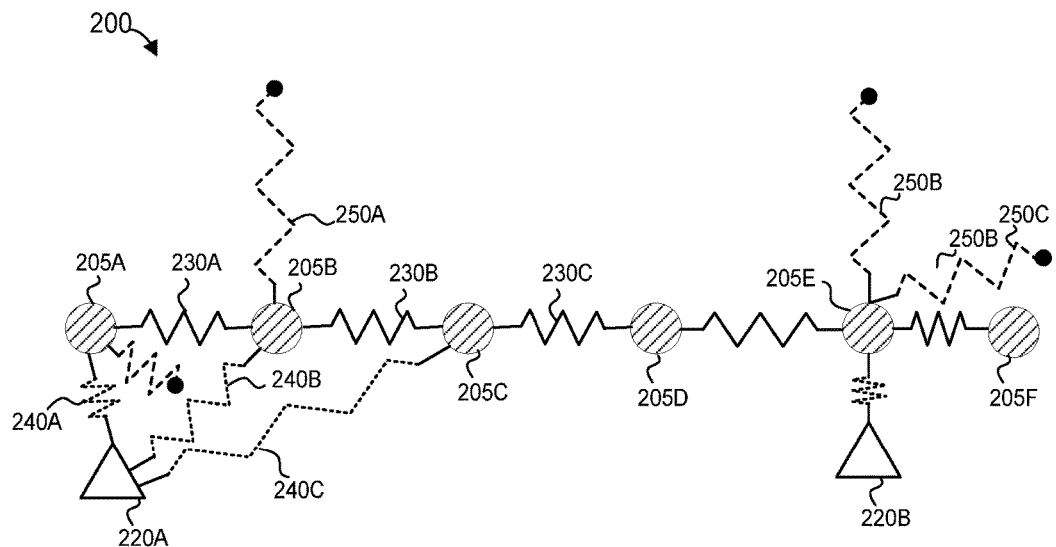
FIG. 2 is a conceptual diagram of applying a SLAM technique to a set of position estimates using a spring analogy, in an initial state.

First referring to FIG. 2, nodes 205 in a model 200 schematically represent location estimates for a certain portable device at different times, in an initial state. These location estimates can be based on GPS signal readings, for example. As a more specific example, the portable device may have reported an observation that includes both a GPS signal read and WLAN scan at time $t_0$, but the location estimate for node 205A can be generated based only on the GPS signals at time $t_0$. Similarly, node 205B represents a location estimate based on GPS signals at time $t_1$, node 205C represents a location estimate based on GPS signals at time $t_2$, etc. In this example, the nodes 205 are separated by equal time intervals, i.e., $t_3-t_2=t_2-t_1=t_1-t_0=$, etc. However, in other scenarios a trace can include data points separated by varying intervals.

In some implementations of the SLAM engine 115, traces from different portable devices can be considered statistically independent from each other. However, as discussed below, some implementation of the SLAM engine 115 account for possible correlations between traces, e.g., where pedestrians likely walk along the same path.

Nodes 220 in FIG. 2 represent initial estimated locations of WLAN (e.g., WiFi) APs. In this example scenario, the APs do not move (at least not while the observations corresponding to the nodes 205 are collected). The sources of satellite signals are of course too remote to model as nodes, nor is there generally a need to do so.

Figure 3:
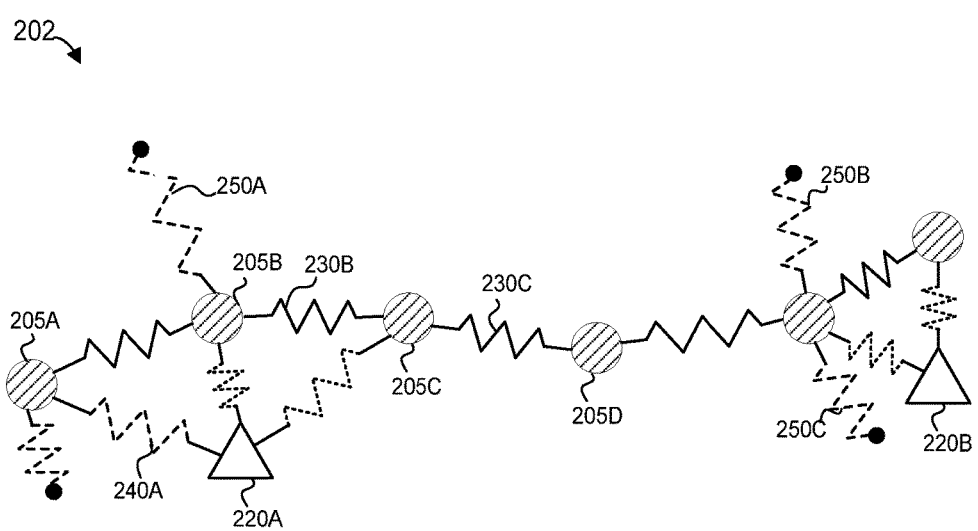
FIG. 3 is a conceptual diagram that illustrates an evolved, minimum-energy state of the set of position estimates of FIG. 2.

In accordance with the graph-based SLAM approach, the nodes 205 and 220 form vertices of a graph, and various relationship between pairs of estimated locations form edges of the graph. The SLAM engine 115 also can use other landmarks as nodes, as discussed below in connection with floorplan data, for example. Also, a graph used in SLAM optimization typically includes multiple traces, and thus FIGS. 2 and 3 represent a highly simplified example.

The edges of the graph represent constraints, which basically quantify the effect of repositioning one node upon another node. For example, the observation corresponding to node 205A can include a measurement of the strength of the signal transmitted by the AP at node 220A, e.g., a received signal strength indicator (RSSI). This RSSI can indicate a certain distance between the portable device and the AP according to a suitable path attenuation model (e.g., 8.5 m), with a certain measurable level of confidence (+/−2 m). This distance and the associated level of confidence constrain repositioning of the node 205A as the model 200 evolves during optimization. Further, repositioning of the node 205A is constrained by the corresponding GPS position fix, or pseudoranges to satellites as discussed below, and the adjacent nodes.

More particularly, springs 230 represent a temporal and directional relationship between consecutive nodes 205A, 205B, 205C, etc. The spring 230A operates on a constraint on repositioning node 205A relative to node 205B, and can incorporate the time difference between the observations of the nodes 205A and 205B, the speed at which the portable device was moving as the user carried the portable device while walking, biking, driving, etc., the direction in which the portable device was moving, etc. To ascertain the speed and the direction of movement at node 205A, the portable device can use an accelerometer, a gyrometer, etc. to locally compute the vector or report these sensor measurements to the SLAM engine 115.

Depending on the level of confidence, the spring 230A can have a larger or lower spring constant k defining stiffness. For example, when the sensors of the portable device report the direction of movement and displacement (which collectively can be referred to as "inertial measurements") with high confidence, the spring 230A can be relatively stiff. As a result, when node 205B is repositioned during optimization too close to node 205A, for example, the compression of the spring 230A will result in a large amount of stored potential energy $kx^2$, with x defining displacement as discussed above. The stored potential energy also can be described as "penalty" in optimization. On the other hand, when the sensors of the portable device report inertial measurements with low confidence, the spring 230A can have lower stiffness, and the same repositioning of node 205B relative to node 205A will result in a lower penalty. In general, the level of confidence of an observation depends on the number of sensors used, the quality of these sensors, the calibration of the sensors, etc.

To continue with this analogy, when the GPS position fixes at nodes 205A and 205B are in close agreement with the inertial measurements at these nodes (i.e., if the displacement calculated based on the inertial measurements accurate predicts the position of node 205B based on node 205A), the spring 230A is neither compressed nor stretched, i.e., is at its equilibrium point.

In addition to springs 230 between consecutive nodes 205, the model includes springs 240 interconnecting estimated locations of APs with the nodes 205A. For example, node 220A representing an estimated location of one AP constraints at least nodes 205A, 205B and 205C, and accordingly the model 200 includes respective springs 240A, 240B and 240C. Although the portable device can still scan from this AP at the estimated location 205D, the model 200 can omit the constraint between nodes 220A and 205D to simplify calculations.

Further, the model 200 includes springs 250 representing GPS constraints. In some embodiments of the SLAM engine 115, each GPS constraint can be generated in view of the confidence level in the accuracy of a set of coordinates. For example, the accuracy for node 205B can be 10 m, and, as a result, repositioning of node 205B by more than 10 m in any direction will result in the same penalty generated by the corresponding GPS spring.

In other embodiments, however, the SLAM engine 115 can generate a separate constraint for each pseudorange, or distance to a satellite. For example, spring 250B in FIG. 2 is a pseudorange constraint on node 205E relative to a first satellite, and spring 250C is a pseudorange constraint on node 205E relative to a second satellite. It is noted that repositioning node 205E in different directions likely results in different sums of pseudorange penalties.

Generally speaking, the model 200 evolves to a lower-energy state 202 through the process of likelihood optimization. In other words, the sum of all penalties, or potential energies stored by the springs 230, 240 and 250 in the model 200 is higher than the sum of all penalties of the springs 230, 240 and 250 in the model 202.

Algebraically, a SLAM problem analogized to a spring system above can be solved using the Least Squares approach:

$$\Pi(P(Z_i|X,M)) \cong \min(\Sigma(-\log(P(Z_i|X,M)))) \quad \text{(Eq. 5)}$$

When measurement likelihoods are all Gaussian, $-\log(P(Z_i|X, M))$ are quadratic functions, and the SLAM engine 115 can minimize a sum of squares using a linear least squares optimizer. Otherwise, when measurement likelihoods are not all Gaussian, the SLAM engine 115 can use a non-linear least squares optimizer.

IV. Associating Asynchronous GPS Signal Readings and 802.11 Access Point Scans with Confidence Levels Referring back to FIG. 1, the traces 150 can include both AP scans (e.g., readings of beacons transmitted by WiFi access points) and measurements of satellite signals (e.g., GPS signals). For example, a user device equipped with a GPS chipset as well as a WLAN chipset can receive asynchronously GPS signals and WLAN signals, both of which can be used separately for positioning. Pairs of AP scans and satellite scans associated with the same time of measurement are referred to in this disclosure as "location service (LS) points." In general, LS points are noisy, i.e., incorporate errors due to signal reflection, attenuation, etc.

The SLAM engine 115 and the AP location model builder 125 in some cases use GPS signal readings as approximations of user locations, and use determined user locations to ascertain the locations of access points. An LS point on a highway, for example, typically corresponds to a clear line-of-sight to satellites, and accordingly to high accuracy of the GPS position fix. However, LS points associated with low accuracy can result in significant errors in AP modeling.

V. Using GPS Pseudoranges in SLAM Analysis

A typical GPS positioning component operating in a portable computing device can output a GPS position fix in the form of coordinates specifying a point in three-dimensional space. However, GPS position fixes sometimes have only low accuracy, and GPS measurement error in consecutive GPS position fixes can have a strong autocorrelation. Moreover, a device in some cases "sees" less than four satellites, which are necessary to obtain a GPS position fix.

Figure 4:
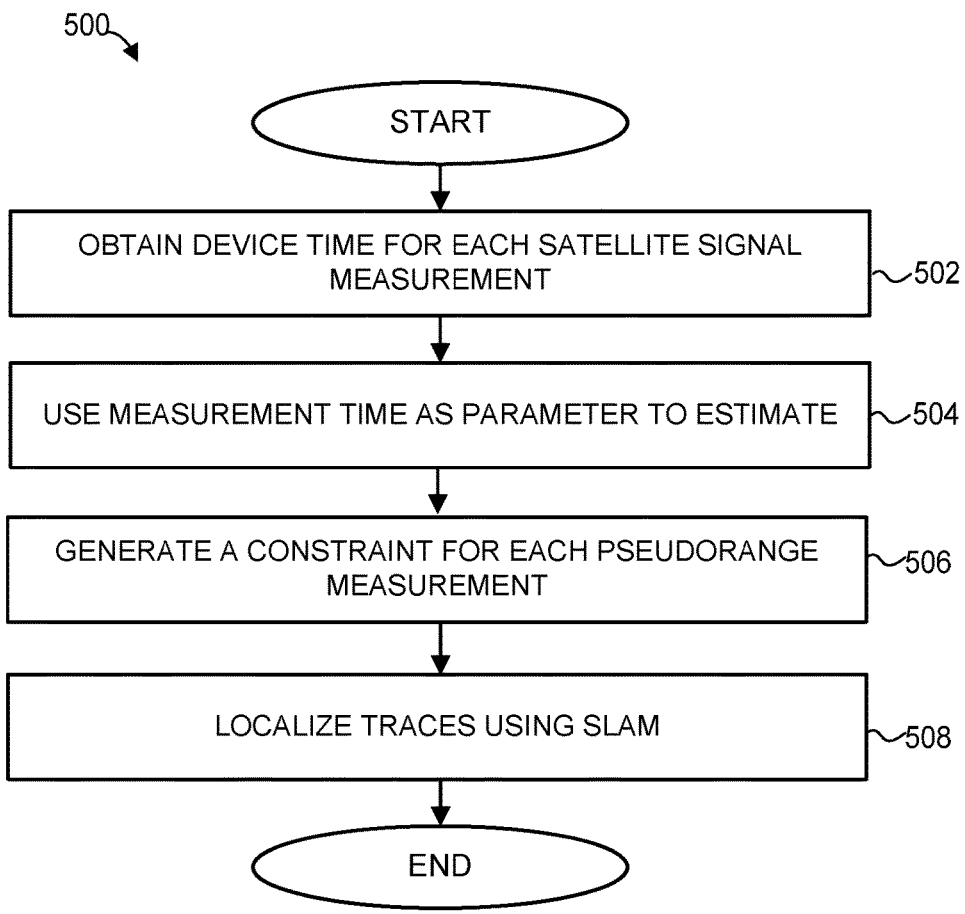
FIG. 4 is a flow diagram for localizing traces using pseudoranges of satellite signals as a constraint, which can be implemented in the system of FIG. 1.

The SLAM engine 115 in some implementations uses pseudoranges, or distances between the GPS receiver in the portable device and the satellites, as additional constraints used in graph-based SLAM optimization. The SLAM engine 115 thus estimates the x, y, and z parameters along with the time parameter (device time or device time bias). For example, the SLAM engine 115 can implement an example method 500 for using pseudoranges of satellite signals as constraints in SLAM, illustrated in FIG. 4.

At block 502, device time for each satellite measurement is obtained. For example, if the portable device at a certain time can detect signals from four satellites, which is the minimum number required to solve for the four unknowns (x, y, and z and clock bias) and obtain a GPS position fix, pseudoranges from each of the four satellites at time t are obtained.

In some cases, the SLAM engine 115 can operate on measurements that include signals from less than four satellites. When the portable device "sees" the number of satellites (e.g., one, two, three) that is insufficient to generate a GPS positioning fix, these measurements still can operate as constraints. As a more specific example, although seeing only two satellites is not enough to solve for x, y, z and clock bias by itself, this information is still valuable to the SLAM engine 115, as this information defines a surface on which the solution must lie. The SLAM engine 115 effectively fuses this information with other information as part of graph-based SLAM optimization to generate more accurate location estimates. As a trivialized example, three consecutive GPS measurements, each corresponding to two different satellites, might create three surfaces, and those three surfaces will likely only intersect in one point, hence allowing to solve for the device position. In a typical case, the SLAM engine 115 uses multiple constraints of different types (e.g., distances to access points of wireless local area networks, floor plan data, motion constraints) along with GPS measurements.

Next, time of measurement at the portable device is introduced as a parameter to estimate in SLAM optimization (block 504), and a respective constraint is generated for each pseudorange measurement (block 506). Further, in some implementations, the SLAM engine 115 can apply additional smoothness constraints between the time estimates of consecutive GPS measurements to model clock drift. The trace then is localized using a suitable SLAM technique, such as graph-based SLAM, at block 508.

To continue with the spring analogy and referring back to FIGS. 2 and 3, each of the pseudorange constraints operates as a separate spring. Thus, repositioning a location estimate can result in separate penalties for each pseudorange. In contrast, using a GPS position fix with a certain accuracy as a single constraint is analogous to applying a single spring to the location estimate.

VII. Using Floorplans in SLAM Optimization

Figure 5A:
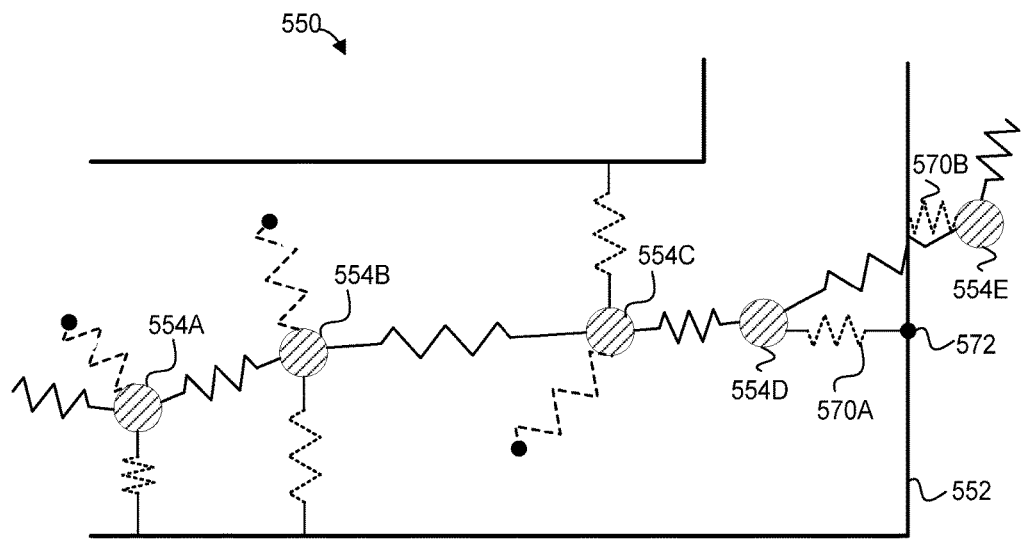
FIG. 5A is a conceptual diagram that illustrates using wall geometry as a constraint in SLAM processing of a sequence of position estimates of a device (a "trace"), with the constraint applied to position estimates.

Now referring to FIG. 5A, the SLAM engine 115 in this scenario receives floorplan data for a geographic area 550 that includes an indoor region. In this example, the floorplan indicates only external wall geometry 552, but in some cases floorplan data also can indicate interior geometry, e.g., walls, partitions, locations of stairwells, and interior doors. The floorplan data can specify the external wall geometry 552 as one or several polygons. In general, the area 550 can include one or multiple separate indoor regions.

The SLAM engine 115 can use the external wall geometry 552 to constrain transitions in user's positions between indoor and outdoor regions, constrain the locations of APs to indoor regions (or both), and apply different signal path attenuation models for indoor and outdoor regions. More particularly, the SLAM engine 115 can determine the boundaries, or obtain previously determined boundaries, of indoor and outdoor regions and model propagation of magnetic signals and AP signals differently for the indoor and the outdoor regions.

Further, the SLAM engine 115 can use external walls and, in some cases, internal walls to account for attenuation of AP signals as measurement priors in SLAM optimization. Still further, the SLAM engine 115 can determine the general orientation of the building and use the determined orientation as a walking direction prior in SLAM optimization. The SLAM engine 115 also can identify intersections between multiple user trajectories and external wall geometry 552 to estimate the locations of exists, and further constrains location estimates in view of these locations.

Referring to scenario 550 of FIG. 5A, for example, nodes 554 represent location estimates for a trace of a portable computing device being carried by a user in a building. As discussed above with reference to FIGS. 2 and 3, the location estimates 554 can be constrained by GPS position fixes or GPS pseudoranges, AP scans and inertial measurements. In one embodiment, the SLAM engine 115 also determines a signed distance between a location estimate and a point on the external wall geometry 552 to generate a corresponding constraint. The signed distance to the wall can be positive for a location estimate outside all the polygons enclosing indoor regions, and negative for a location estimate inside of the polygons (see FIG. 8 below). The signed distance call be measured along a normal from a location estimate to the nearest polygon.

The SLAM engine 115 determines that the indoor region is enclosed where the trace intersects the wall. To this end, the SLAM engine 115 can use the techniques discussed with reference to FIGS. 6A and 6B below. It is evident from the inspection of FIG. 5A that the nodes 554D and 554E probably should not be on different sides of an exterior wall. Thus, to continue with the spring analogy, a spring 570A pushes the node 554D away from the wall relative to point 572, where the normal from the node 554D intersects the line included in the wall geometry 552. A spring 570B pulls the mode 554E into the indoor region. Referring again to the algebraic description of SLAM optimization, the springs 570A and 570B correspond to constraints weighed by the signed distance to the wall.

Figure 5B:
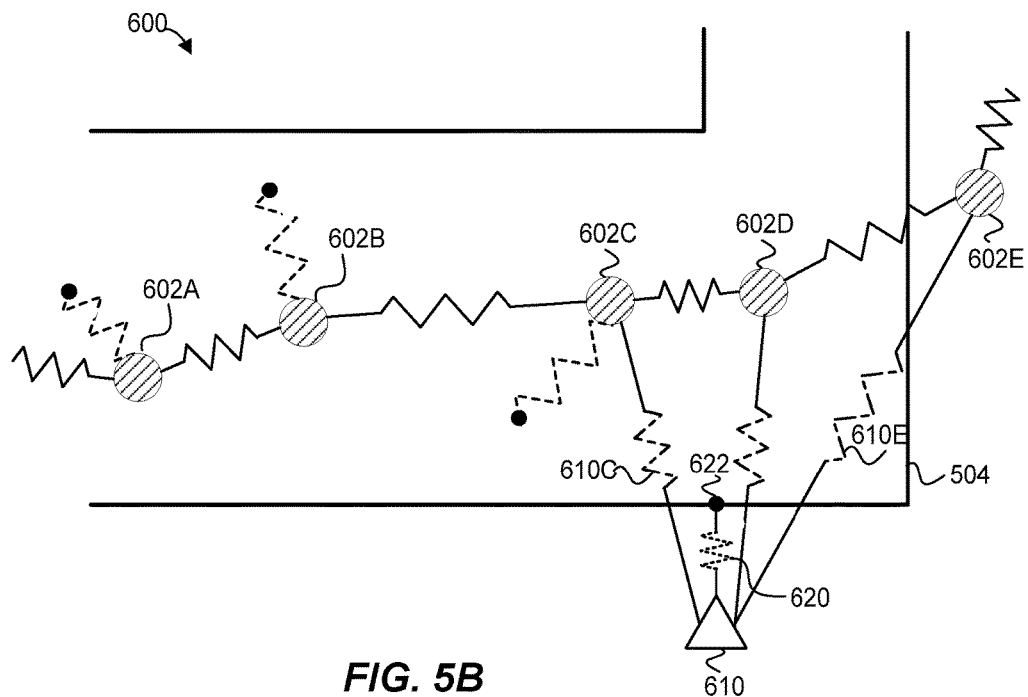
FIG. 5B is a conceptual diagram that illustrates using wall geometry as a constraint in SLAM processing of a sequence of position estimates of a device (a "trace"), with the constraint applied to access point positions.

FIG. 5B illustrates an application of similar constraints to locations of APs, again using a spring analogy. In scenario 600, a trace of a portable device includes a sequence of nodes 602A, 602B, etc. Node 610 represents an estimated location of an AP, and springs 610C, 610D, and 610E represent AP signal constrains relative to the nodes 602C, 602D and 602E, respectively. A spring between the node 610 and a point 622, disposed on a normal from the node 610 to the wall, pulls the node 610 indoors, as APs in general are expected to be located indoors.

Figure 6A:
FIG. 6A is a conceptual diagram that illustrates the use of multiple traces along with wall geometry to estimate locations of doors.
Figure 6B:
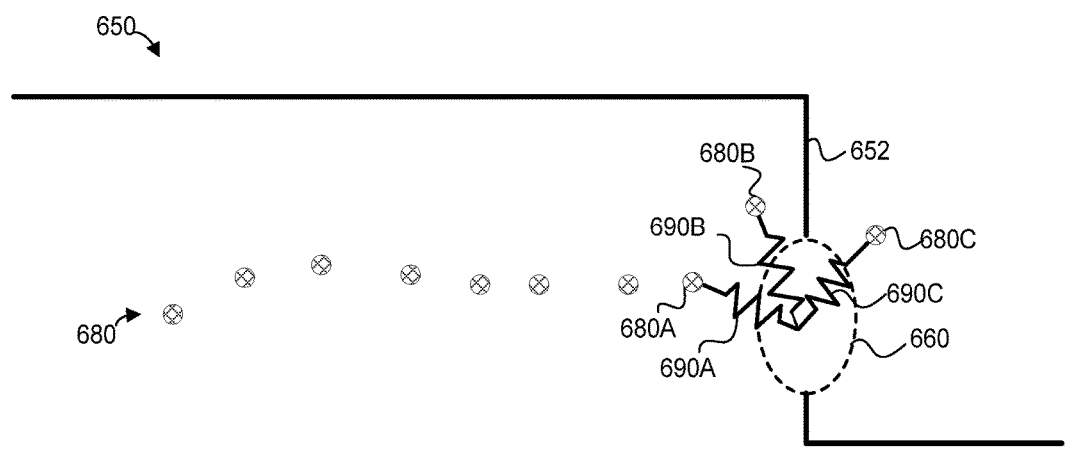
FIG. 6B is a conceptual diagram that illustrates the use of estimated locations of doors to constrain subsequent traces.

Referring to FIG. 6A, the SLAM engine 115 in scenario 650 determines an area 660 where multiple traces such as traces 654 and 656 intersect external wall geometry 652. For example, the SLAM engine 115 can determine N traces appear to include both indoor and outdoor sections, and that M of these traces intersect the external wall geometry 652 within a certain distance D of each other. If the ratio of M to N exceeds a certain threshold value, the SLAM engine 115 can determine that the 660 includes an entrance into the indoor region. As illustrated in FIG. 6B, the SLAM engine 115 then can generate constraints relative to the center of the area 660 and apply these constraints to some of the location estimates in a trace 680. Thus, springs 690A, 690B and 690C pull nodes 680A, 680B and 680C toward the determining opening and away from the walls.

Figure 7A:
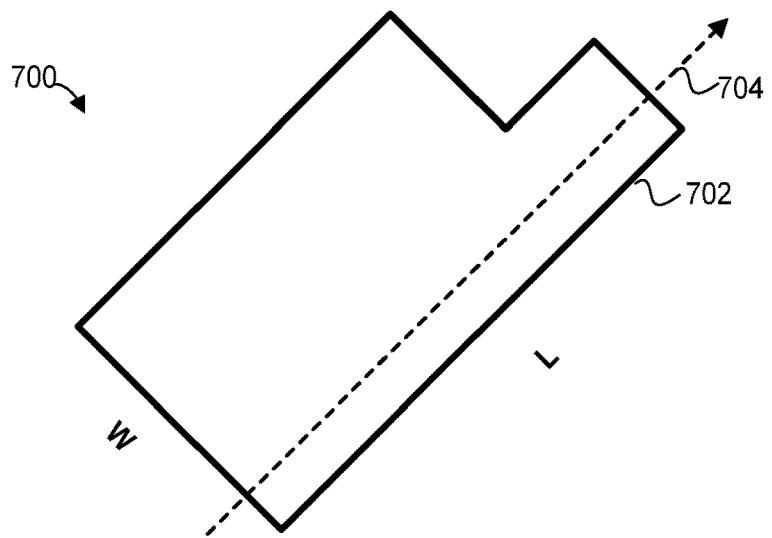
FIG. 7A schematically illustrates an outline of a building for which the system of FIG. 1 can determine an orientation.
Figure 7B:
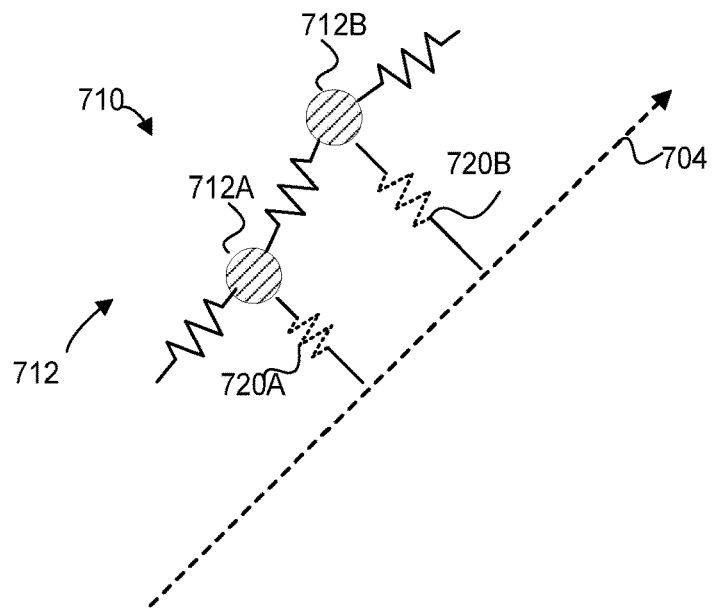
FIG. 7B is a diagram that schematically illustrates how building orientation can be applied as a prior in SLAM optimization.

In some implementations, the SLAM engine 115 can create still further constraints on location estimates based on floorplan data. For example, FIG. 7A illustrates an outline of a building 702. The SLAM engine 115 can identify an orientation 704 based on the length-to-width ratio of the building 702, for example, or by connecting a pair of entrance of the building 702 with a virtual axis, for example. In any case, the SLAM engine 115 then can use the orientation 704 to add constraints to example nodes 712A and 712B in a trace 712. Using the spring analogy, springs 720A and 720B push the nodes 712A and 712B so as to align with a virtual axis parallel to the orientation 704.

Figure 8:
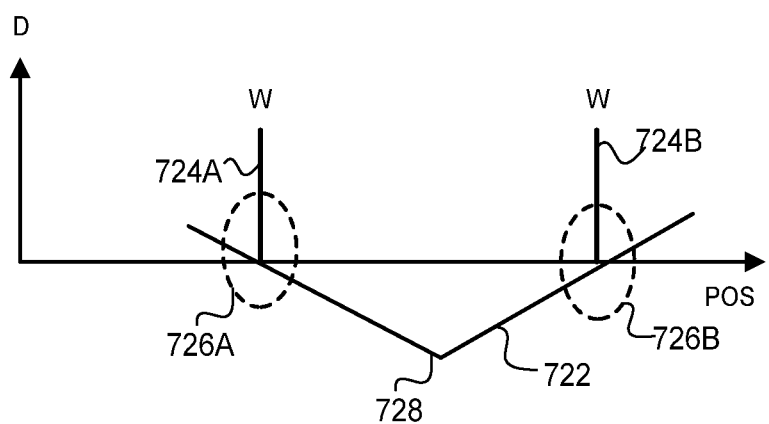
FIG. 8 is a graph of signed distance to an exterior wall of a building plotted against the position of a location estimate.

For further clarity, FIG. 8 illustrates how signed distance 722 varies with the position relative to walls 724A and 726B, with the indoor region disposed between the walls 724A and 724B, according to one implementation of the SLAM engine 115. The signed distance is at zero where the position of a location estimate intersects wall geometry. The signed distance in this example implementation is positive outside the wall and negative inside the indoor region. Further, the signed distance is continuously defined in regions 726A and 726B near these intersections. Although the signed distance can include a discontinuity at point 728, the SLAM engine 115 in one implementation uses only the approximate regions 726A and 726B when generating constraints. In terms of the spring analogy, once a location estimate is within the indoor region and is X meters from the wall 724A and 726B, the spring pulling the location estimate indoors no longer biases the location estimate toward any other particular point within the indoor region.

Figure 9:
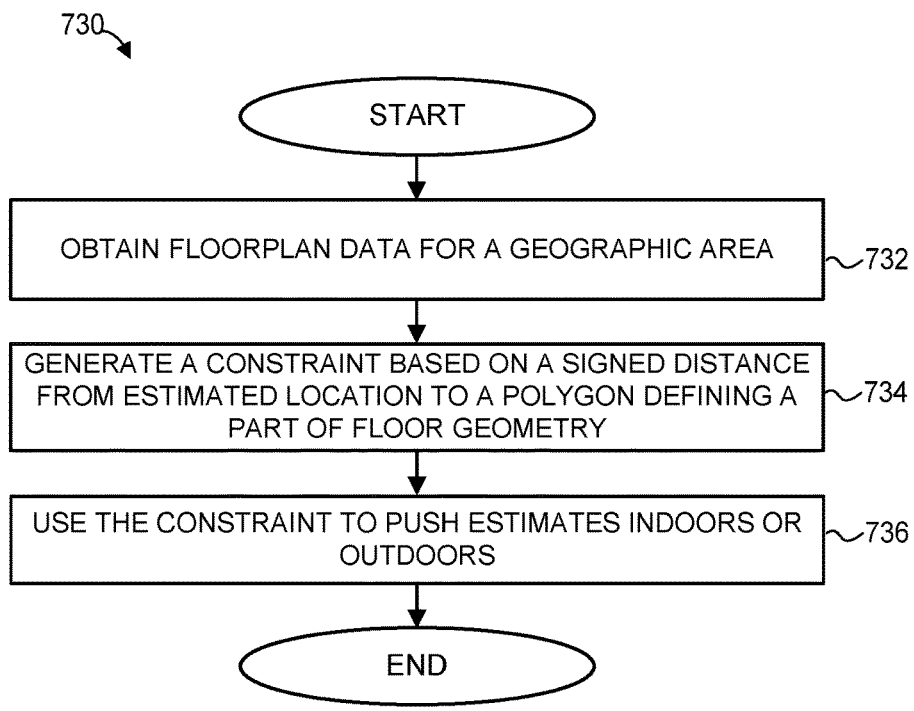
FIG. 9 is a flow diagram of an example method of using floor geometry as a constraint in SLAM to adjust local estimates, which can be implemented in the system of FIG. 1.

FIG. 9 is a flow diagram of an example method 730 of using floor geometry as a constraint in SLAM to adjust local estimates, which the SLAM engine 115 can implement. At block 732, floorplan data for a geographic area is obtained. At block 734, a constraint is generated. The constraint is based on a signed distance between a location estimate and a polygon defining a portion or the entirety of floor geometry. At block 736, the constraint is used to push estimates indoors or outdoors.

Figure 10:
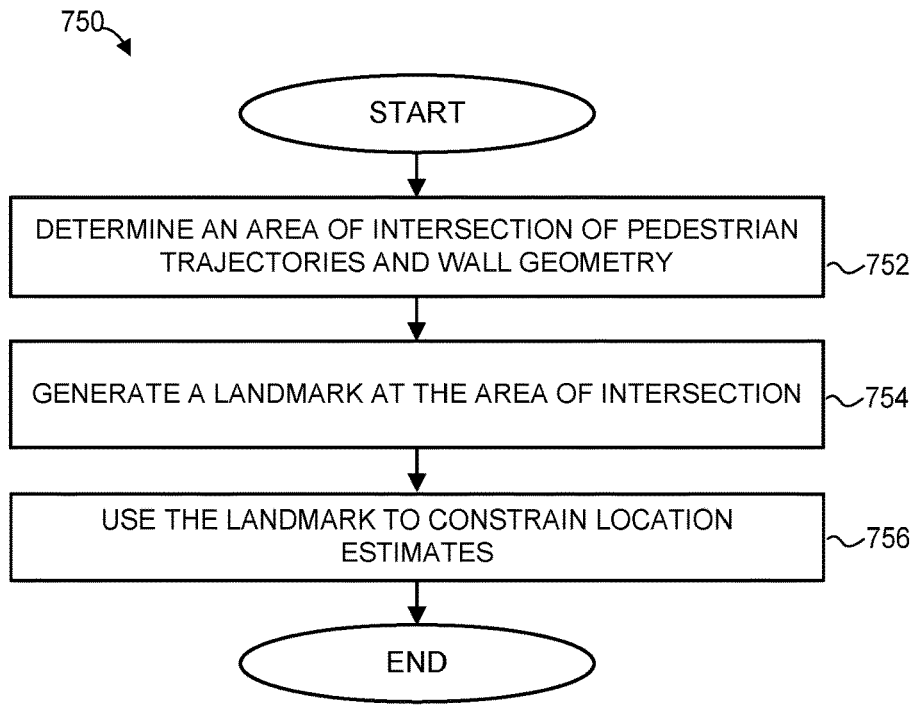
FIG. 10 is a flow diagram of an example method for using multiple traces from pedestrians to estimate the locations of doors, which can be implemented in the system of FIG. 1.

FIG. 10 is a flow diagram of an example method 750 for using multiple traces from pedestrians to estimate the locations of doors, which the SLAM engine 115 can implement. At block 752, an area where multiple traces corresponding to pedestrian trajectories intersect wall geometry is identified. A landmark corresponding to this area is generated at block 754. This landmark can correspond to a door or another opening into the indoor region. At block 756, the landmark is used to constrain location estimates. For example, for a certain trace T, a certain number N (e.g., four) of location estimates most proximate to the landmark are biased so as to direct the trace T through the opening rather than through the wall when the trace T transitions between the indoor and outdoor regions.

VIII. Integration of Motion Maps into SLAM Analysis

In some implementations, the system 100 also generates and integrates motion maps into SLAM optimization. The system 100 or other computing devices also can use motion maps to localize traces, as discussed below. Generally speaking, a motion map reflects the fact that people walking through the same geographic area are likely to walk in the same direction or, more generally, follow trajectories that are similar for certain segments. In some cases, this concept can be extended to other types of motion, e.g., bicycling.

Figure 11:
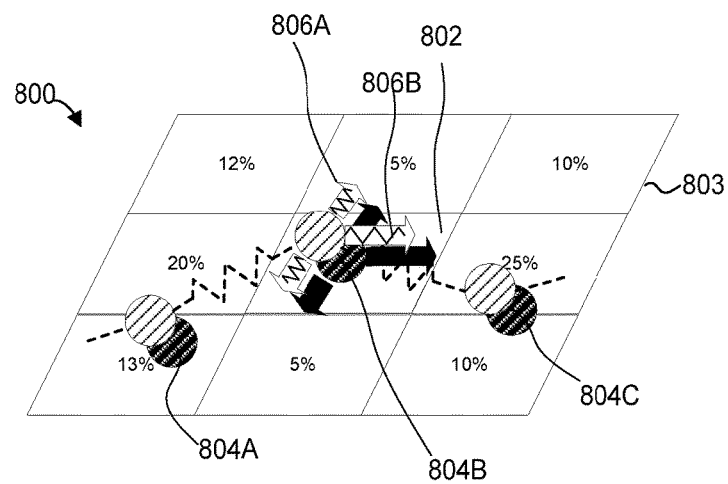
FIG. 11 is a conceptual diagram that illustrates using a grid of probabilities of moving into a particular direction relative to a certain location to adjust a trace from a portable device.

Referring to FIG. 11, a grid of probabilities 802 defines a portion of a motion map 800 for a certain cell 803. According to the grid of probabilities 802, a user located within the cell 803 (which can correspond to a small geographic area, such as 2 m×2 m), has a 25% probability of moving to the right, a 20% probability moving to the left, a 5% probability of moving up relative to the orientation of FIG. 11, etc. When a trace including nodes 804A, 804B and 804C is superimposed on the grid of probabilities 802, constraints schematically depicted as springs 806 operate on the node 804B, in addition to inertial constraints, AP scan constraints, etc. discussed above.

The motion map 800 in some implementations can indicate the probability of moving in a direction $D_i$ from cell C given that cell C was reached from $D_j$. For example, if a user reaches a certain cell from the left, a motion map can indicate a certain probability of continuing walking right from the cell but, at the same time, the probability of walking may be lower if the user reached cell C from a different direction. Thus, according to this implementation, the example cell 803 specifies six sets of probabilities (a respective set for each of North, Northeast, East, Southeast, South, Southwest, West, and Northwest), with each set including different probabilities of moving in the corresponding direction given that the direction from which the cell was reached was North, Northeast, East, etc.

The system 100 can apply constraints directly to nodes 804A-C, which may correspond to location estimates based on positioning fixes, for example, or to segments of the trace that includes these nodes. More specifically, the system 100 can divide the trace into multiple directed segments, in accordance with the direction of motion which, in turn, can be determined based on the sequence of measurements included in the trace. Thus, one directed segment can have node 804A as the origin and node 804B as the destination, another directed segment can have node 804B as the origin and node 804C as the destination, etc. The length of the segments can be selected in view of the size of the cell 803. For example, each cell 803 can be a square with a side of N meters, and each segment can be N meters long. The system 100 can apply constraints (similar to those represented by springs 806) so as to "encourage" the direction of the trace for each segment to agree with the probabilities indicated by the cell at that location.

The system 100 can generate the motion map 800 by obtaining a data set that includes multiple pedestrian traces, dividing a geographic area into cells of a suitable size, selecting a finite number of directions relative to the center of a cell (e.g., six as discussed in the example above) and, for each direction, computing the probability of moving in that direction. In an example implementation, the system 100 computes the conditional probability of moving in direction X given that the cell was reached from direction Y.

In some implementations, the motion map 800 can indicate the likelihood of certain locations being walkable. A high likelihood of a location being walkable may indicate the presence of a walkway.

Figure 12:
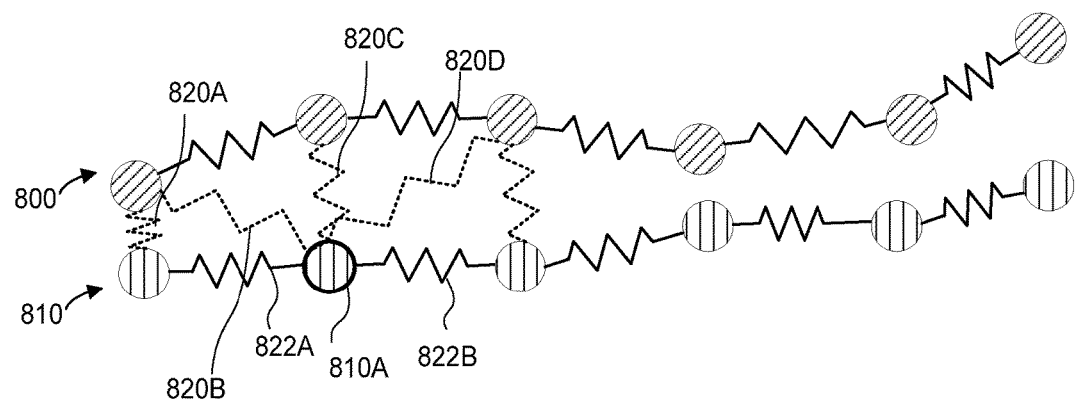
FIG. 12 is a conceptual diagram that illustrates using several traces from different portable devices as mutual constraints in localization.

Further, FIG. 12 schematically illustrates applying constraints to proximate traces so that the traces are likely to follow similar trajectories. The SLAM engine 115 can apply constraints such that traces that are near each other and parallel can be pulled toward each other. In this example, the SLAM engine 115 generates constraints that bias location estimates in different traces toward each other. Hence, in terms of the spring analogy, springs 820A, 820B, 820C connect pairs of nodes in different traces 800 and 810. An example node 810A is connected to consecutive nodes in the same trace 810 via springs 822A and 822B, and with several proximate nodes in the trace 800 via the springs 820B, 820C and 820D.

Figure 13:
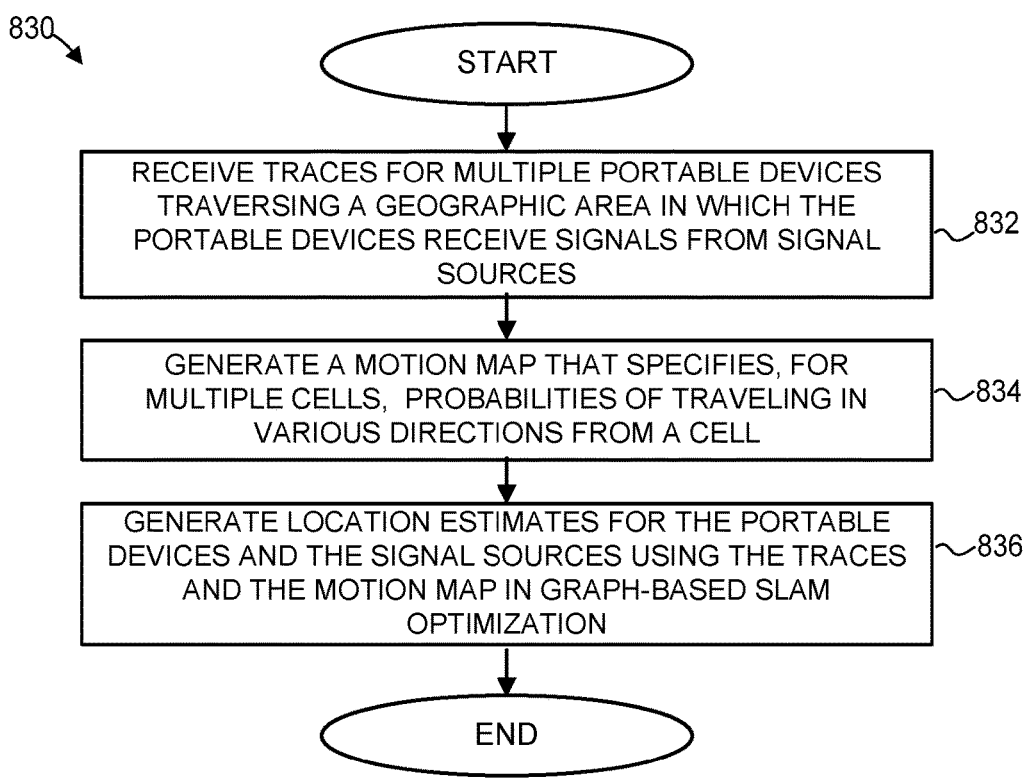
FIG. 13 is a flow diagram of an example method for applying a motion map in graph-based SLAM optimization.

FIG. 13 is a flow diagram of an example method 830 for carrying out graph-based SLAM optimization using motion maps. At block 832, traces for multiple portable devices in a certain geographic area are received. As discussed above, traces in general can include measurements of various signals. At block 834, a motion map can be constructed. Each cell of the motion map can indicate probabilities of moving in a certain direction relative to the cell. In some implementations, a motion map can indicate different probabilities for certain directions, depending on the direction from which the cell was reached, as discussed above. Next, at block 836, the motion map can be applied in graph-based optimization. In particular, the probabilities of motion in a certain direction specified by the motion map for the corresponding cells can operate as constraints along with other constraints, including those discussed in this disclosure. These other constraints can include wireless signals from 802.11 access points, GPS pseudoranges, indications of exterior and/or interior geometry, etc.

Figure 14:
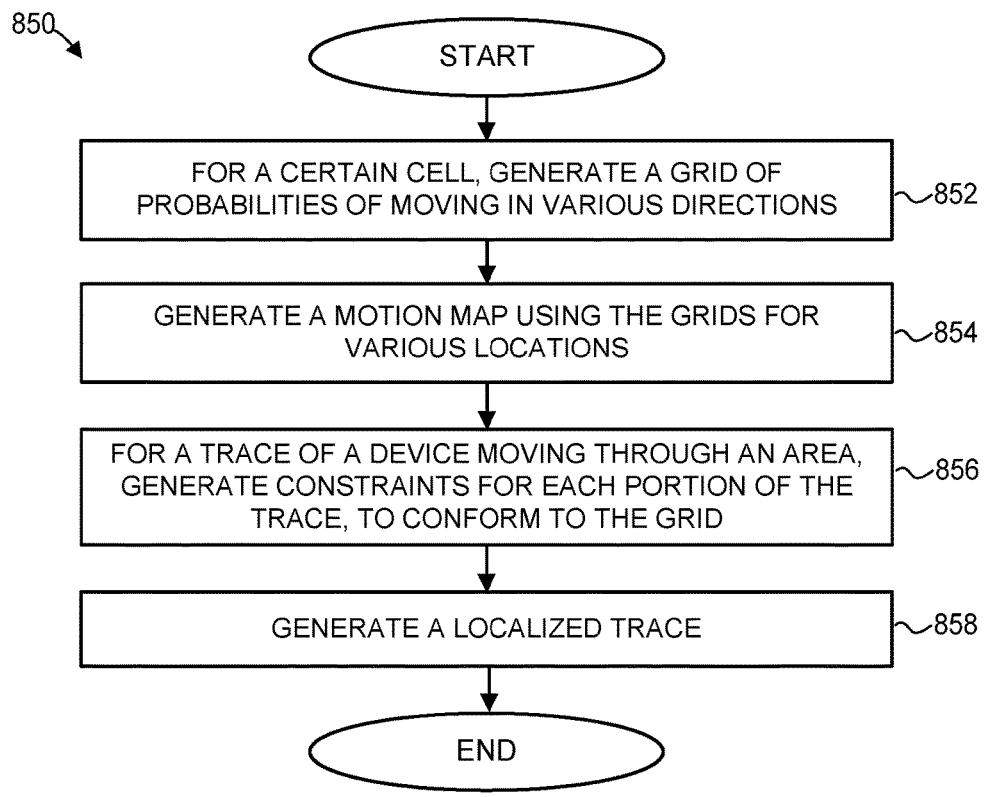
FIG. 14 is a flow diagram of an example method for adjusting a trace using a grid of probabilities as a constraint, which can be implemented in the system of FIG. 1.

Once constructed, a model that incorporates a motion map can be implemented in the system 100 or can be provided to any suitable computing device (e.g., to locally implement an API for localizing a trace at a third-party network server or even an individual client device). FIG. 14 is a flow diagram of an example method 850 for adjusting a trace using a grid of probabilities as a constraint, which the SLAM engine 115 can implement. At block 852, a grid of probabilities for a certain location (or cell) is generated. For example, the grid of probabilities can define probabilities of moving one of six directions, as illustrated in FIG. 12. In other implementations, the grid of probabilities can define a larger number of possible directions, e.g., twelve. In a similar manner, a respective grid of probabilities can be defined for multiple cells in a geographic area to define a larger motion map, at block 854.

Next, at block 856, a trace of a portable device moving through the geographic area can be superimposed on the motion map. For a certain portion of the trace (one or several nodes corresponding to location estimates) disposed over a certain cell, constraints are generated in accordance with the probability grid. At block 858, SLAM optimization is completed with the additional constraints to generate a located trace.

XI. Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed is:

1. A method of performing simultaneous localization and mapping (SLAM) optimization, the method comprising:
    receiving, by one or more processors, traces collected by multiple portable devices moving within a geographic area that includes an indoor region, each of the traces including measurements of wireless signals sources at different times by a same device, and at least some of the traces including pseudorange measurements related to distances to respective satellites; and
    generating, by the one or more processors, location estimates for the portable devices and the signal sources using graph-based SLAM optimization of the location estimates, including, for at least some of the location estimates:
        generating constraints for the pseudorange measurements, and
        applying the generated constraints for the pseudorange measurements in graph-based SLAM optimization.

2. The method of claim 1, wherein generating constraints for the pseudorange measurements includes separately estimating a time parameter and at least one coordinate parameter.

3. The method of claim 2, wherein generating the constraints for the pseudorange measurements includes separately estimating the time parameter and each of x, y, and z coordinates.

4. The method of claim 1, wherein at least some of the pseudorange measurements include measurements from less than a minimum number of satellites necessary to generate a position fix.

5. The method of claim 1, further comprising generating smoothness constrains between time estimates of consecutive pseudorange measurements, to model clock drift.

6. The method of claim 1, wherein at least some of the traces include measurements of wireless signals from access points of wireless local area networks, and wherein generating the location estimates includes generating constraints for the measurements of the wireless signals from the access points.

7. The method of claim 1, further comprising:
    receiving, by the one or more processors, floorplan data indicative of at least external wall geometry for the area;
    determining signed distances between at least some of the location estimates and respective points in the external wall geometry; and
    applying the signed distances as a third constraint in the graph-base SLAM optimization.

8. A computing system configured to perform simultaneous localization and mapping (SLAM) optimization, the computing system comprising:
    processing hardware; and
    a non-transitory computer-readable medium storing thereon instructions that, when executed by the processing hardware, cause the system to:
        receive traces collected by multiple portable devices moving within a geographic area that includes an indoor region, each of the traces including measurements of wireless signals sources at different times by a same device, and at least some of the traces including pseudorange measurements related to distances to respective satellites,
        generate location estimates for the portable devices and the signal sources using graph-based SLAM optimization of the location estimates, including, for at least some of the location estimates:
            generate constraints for the pseudorange measurements, and
            apply the generated constraints for the pseudorange measurements in graph-based SLAM optimization.

9. The computing system of claim 8, wherein to generate the constraints for the pseudorange measurements, the instructions further cause the system to separately estimate a time parameter and at least one coordinate parameter.

10. The computing system of claim 9, wherein to generate the constraints for the pseudorange measurements, the instructions further cause the system to separately estimate the time parameter and each of x, y, and z coordinates.

11. The computing system of claim 8, wherein at least some of the pseudorange measurements include measurements from less than a minimum number of satellites necessary to generate a position fix.

12. The computing system of claim 8, wherein the instructions further cause the system to generate smoothness constrains between time estimates of consecutive pseudorange measurements, to model clock drift.

13. The computing system of claim 8, wherein at least some of the traces include measurements of wireless signals from access points of wireless local area networks, and wherein to generate the location estimates, the instructions cause the system to generate constraints for the measurements of the wireless signals from the access points.

14. The computing system of claim 8, wherein the instructions further cause the system to:
    receive floorplan data indicative of at least external wall geometry for the area;
    determine signed distances between at least some of the location estimates and respective points in the external wall geometry; and
    apply the signed distances as a third constraint in the graph-base SLAM optimization.

15. A non-transitory computer-readable medium storing thereon instructions that, when executed by one or more processors, cause the one or more processors to:
    receive traces collected by multiple portable devices moving within a geographic area that includes an indoor region, each of the traces including measurements of wireless signals sources at different times by a same device, and at least some of the traces including pseudorange measurements related to distances to respective satellites; and generate location estimates for the portable devices and the signal sources using graph-based simultaneous localization and mapping (SLAM) optimization of the location estimates, including, for at least some of the location estimates:

generate constraints for the pseudorange measurements, and apply the generated constraints for the pseudorange measurements in graph-based SLAM optimization.

16. The non-transitory computer-readable medium of claim 15, wherein to generate the constraints for the pseudorange measurements, the instructions further cause the one or more processors to separately estimate a time parameter and at least one coordinate parameter.

17. The non-transitory computer-readable medium of claim 16, wherein to generate the constraints for the pseudorange measurements, the instructions further cause the one or more processors to separately estimate the time parameter and each of x, y, and z coordinates.

18. The non-transitory computer-readable medium of claim 15, wherein at least some of the pseudorange measurements include measurements from less than a minimum number of satellites necessary to generate a position fix.

19. The non-transitory computer-readable medium of claim 15, wherein the instructions further cause the one or more processors to generate smoothness constrains between time estimates of consecutive pseudorange measurements, to model clock drift.

20. The non-transitory computer-readable medium of claim 15, wherein at least some of the traces include measurements of wireless signals from access points of wireless local area networks, and wherein to generate the location estimates, the instructions cause the one or more processors to generate constraints for the measurements of the wireless signals from the access points.

* * * * *